United States Patent Office 2,844,635
Patented July 22, 1958

2,844,635

SIDE CHAIN HALOGENATION OF SUBSTITUTED AROMATIC COMPOUNDS

Rowland H. Mayor, Cuyahoga Falls, Ohio, assignor to The Goodyear Tire & Rubber Company, Akron, Ohio, a corporation of Ohio No Drawing. Application September 28, 1954
Serial No. 458,982

9 Claims. (Cl. 260—651)

This invention relates to the halogenation of aromatic compounds costaining one or more aliphatic side-chains. More particularly this invention relates to a method of halogenating such materials by which nuclear substitution is minimized or completely inhibited and halogenation occurs substantially completely in the aliphatic side-chain even though the halogenation is carried out in the presence of "halogen-carriers" which normally cause nuclear substitution.

The selective side-chain halogenation of araliphatic materials such as toluene or xylene is a well-known general procedure. Usually this type of reaction is carried out in glass apparatus in the presence of light, but in the absence of metallic ions. However, if a "halogen-carrier" such as iron is present, the mixture quickly becomes black, and chlorine absorption is slowed down or completely prevented. In addition to discoloration, tar formation, nuclear substitution and other undesirable effects are obtained when the halogenation is carried out in the presence of iron, or iron compounds, or other "halogen-carriers."

It is an object of this invention to provide a method of preventing the discoloration of aliphatic-substituted aromatic compounds in the side-chain halogenation of such compounds, even though a metal "halogen-carrier," such as iron, be present.

Another object of this invention is to provide a catalyst which directs substitution to the aliphatic side-chain of aliphatic-substituted aromatic compounds during the course of halogenation reactions and which substantially prevents nuclear substitution.

Still another object of this invention is to provide a method of halogenating aliphatic-substituted aromatic compounds in the presence of iron, or in iron equipment, in which substitution of the halogen takes place substantially completely in the aliphatic side-chains.

Another object of this invention is to provide a catalyst which inhibits the deleterious effect of iron and its compounds.

According to this invention, aliphatic-substituted aromatic compounds are halogenated in the presence of light and in the presence of an open chain alkylene polyamine to give products in which the halogenation is effected substantially completely in the side-chains and nuclear halogenation is minimized or completely prevented, even though a metal "halogen-carrier," such as iron or iron compounds, be present.

The practice and efficacy of the invention are illustrated by the following examples:

Example 1

A one-liter three-neck flask was equipped with a stirrer made of iron wire, a chlorine inlet tube and a condenser. Two hundred grams of metaxylene containing 1.0 milliliter of tetraethylene pentamine were added to the flask. The charge was heated to a temperature of 125 to 150° C. and the temperature was maintained in this range while chlorine was bubbled into the charge as rapidly as it could be absorbed. During the chlorination the mixture was illuminated with a 150-watt light. At 18 hours the mixture was reddish brown in color and 59% of the theoretical amount of chlorine had been absorbed. One-half milliliter of tetraethylene pentamine was added and chlorination was continued. At 32½ hours chlorination was stopped. The product after degassing and crystallization gave an 84% yield of crude hexachlorometaxylene.

Example 2

A reaction was run under conditions similar to that of Example 1 except that 1.0 milliliter of triethylene tetramine was added in the place of tetraethylene pentamine. The mixture was reddish brown in color after 10 hours of chlorination, when 46% of the theoretical amount of chlorine had been absorbed.

Example 3

A reaction was run under conditions similar to that of Examples 1 and 2 except that diethylene triamine was added in the place of tetraethylene pentamine. The mixture was reddish brown in color after 14 hours of chlorination, when 46% of the theoretical amount of chlorine had been absorbed.

When such a chlorination is carried out in the presence of iron, but without an ethylene polyamine, the mixture changes color from orange to brown and at the end of two hours is nearly black. Chlorine absorption virtually stops at the dark brown stage.

Thus this invention provides a method of carrying out side chain halogenation of aliphatic-substituted aromatic hydrocarbons under conditions which normally induce nuclear halogenation. By the method of this invention nuclear halogenation is prevented and the production of these side-chain halogenated products can be more readily carried out on a commercial scale, even in the presence of iron or using iron equipment.

The amount of the open chain alkylene polyamine catalyst used may be varied over a wide range. As little as 0.1% based on the weight of the aliphatic-substituted aromatic compound can be used, but usually the amount needed will be from 0.2 to 10%. The amount of the open chain alkylene polyamine required for protection against the deleterious effects of the "halogen-carrier" is dependent upon the amount and the form of the "halogen-carrier." For example, soluble iron compounds or finely-divided iron powder require more of the open chain alkylene polyamine catalyst for successful side-chain halogenation than does a single large piece of iron metal. During the chlorination of metaxylene, 0.50% by weight of the open chain alkylene polyamine, based on the metaxylene, is sufficient when an iron wire stirrer is used to agitate the halogenation mixture. However, if a small amount of iron powder or ferric chloride is added to the halogenation mixture, 5 to 10 parts by weight of the alkylene polyamine, based on the weight of iron powder or ferric chloride, are required to inhibit the effect of the added iron and to give a successful halogenation reaction in which the halogenation occurs substantially completely in the side-chain.

The above examples show the method of this invention with particular respect to diethylene triamine, triethylene tetramine and tetraethylene pentamine, but other open-chain alkylene polyamines such as ethylene diamine, pentaethylene hexamine, the propylene polyamines and the butylene polyamines can also be used. Mixtures of these amines can be used if desired and, from a practical standpoint, are preferred since, generally, these materials are more readily available as mixtures.

The invention has been particularly illustrated with respect to chlorination, but it can be used in bromination reactions also. The side-chain halogenation of aliphatic-substituted aromatic compounds can be readily accomplished by the method of this invention and it is a method of general application for the side-chain halogenation of aliphatic-substituted aromatic compounds.

The above examples illustrate the invention for halogenation reactions carried out in the presence of iron and iron compounds. It is also applicable to halogenation reactions in which other materials which catalyze or promote nuclear halogenation are present. Examples of other such materials with which the method of the invention is effective are "halogen-carriers" such as aluminum trichloride, antimony trichloride and, in general, the trivalent metal ions and other catalysts which are well known in the art.

While certain representative embodiments and details have been shown for the purpose of illustrating the invention, it will be apparent to those skilled in this art that various changes and modifications may be made therein without departing from the spirit or scope of the invention.

I claim:

1. A process for effecting side-chain halogenation of an aromatic hydrocarbon compound containing aliphatic side-chains in the presence of a material which catalyzes nuclear halogenation and in the presence of light, which comprises heating and reacting said aromatic compound with a halogen selected from the group consisting of chlorine and bromine in the presence of an open chain alkylene polyamine.

2. A process for effecting side-chain chlorination of an aromatic hydrocarbon compound containing aliphatic side-chains in the presence of a material which catalyzes nuclear halogenation and in the presence of light, which comprises heating and reacting said aromatic compound with chlorine in the presence of an open chain alkylene polyamine.

3. A process for effecting side-chain bromination of an aromatic compound containing aliphatic side-chains in the presence of a material which catalyzes nuclear halogenation and in the presence of light, which comprises heating and reacting said aromatic compound with bromine in the presence of an open chain alkylene polyamine.

4. A process for the side-chain chlorination of a xylene in the presence of a material which catalyzes nuclear halogenation and in the presence of light, which comprises heating and reacting said xylene with chlorine in the presence of from 0.1 to 10% by weight of said xylene of an open chain alkylene polyamine.

5. A process for the side-chain chlorination of a xylene in the presence of a material which catalyzes nuclear halogenation and in the presence of light, which comprises heating and reacting said xylene with chlorine in the presence of from 0.1 to 10% by weight of said xylene of diethylene triamine.

6. A process for the side-chain chlorination of a xylene in the presence of a material which catalyzes nuclear halogenation and in the presence of light, which comprises heating and reacting said xylene with chlorine in the presence of from 0.1 to 10% by weight of said xylene of triethylene tetramine.

7. A process for the side-chain chlorination of a xylene in the presence of a material which catalyzes nuclear halogenation and in the presence of light, which comprises heating and reacting said xylene with chlorine in the presence of from 0.1 to 10% by weight of said xylene of tetraethylene pentamine.

8. A process for the side-chain halogenation of an aromatic hydrocarbon compound containing aliphatic side-chains in the presence of a material which catalyzes nuclear halogenation and in the presence of light, which comprises heating and reacting said aromatic compound with a halogen selected from the group consisting of chlorine and bromine in the presence of an open chain alkylene polyamine selected from the group consisting of ethylene diamine, diethylene triamine, triethylene tetramine, tetraethylene pentamine and pentaethylene hexamine.

9. A process for the side-chain chlorination of a xylene in the presence of a material which catalyzes nuclear halogenation and in the presence of light, which comprises heating and reacting said xylene with chlorine at a temperature of 125–150° C. in the presence of from 0.1 to 10% of said xylene of a polyethylene polyamine.

References Cited in the file of this patent

UNITED STATES PATENTS 2,430,822    Nevison _____ Nov. 11, 1947